United States Patent
Banka et al.

(10) Patent No.: US 9,692,645 B2
(45) Date of Patent: Jun. 27, 2017

(54) DISTRIBUTED CONTROL PROTOCOL FOR HIGH AVAILABILITY IN MULTI-NODE STORAGE CLUSTER

(71) Applicant: NetApp, Inc., Sunnyvale, CA (US)

(72) Inventors: Deepti Banka, Ghaziabad (IN); Ameya Prakash Usgaonkar, Old Goa (IN)

(73) Assignee: NetApp, Inc., Sunnyvale, CA (US)

( * ) Notice: Subject to any disclaimer, the term of this patent is extended or adjusted under 35 U.S.C. 154(b) by 295 days.

(21) Appl. No.: 14/244,337

(22) Filed: Apr. 3, 2014

(65) Prior Publication Data

US 2015/0227318 A1 Aug. 13, 2015

(30) Foreign Application Priority Data

Feb. 13, 2014 (IN) .............................. 404/DEL/2014

(51) Int. Cl.
*G06F 3/06* (2006.01)
*H04L 12/24* (2006.01)
*H04L 29/08* (2006.01)

(52) U.S. Cl.
CPC .......... *H04L 41/0816* (2013.01); *G06F 3/065* (2013.01); *G06F 3/0617* (2013.01); *H04L 41/08* (2013.01); *H04L 67/1097* (2013.01)

(58) Field of Classification Search
CPC ......... H04L 12/00; H04L 12/26; H04L 41/00; H04L 41/06; H04L 41/08–41/0816;
(Continued)

(56) References Cited

U.S. PATENT DOCUMENTS 6,006,259 A * 12/1999 Adelman ................ H04L 29/06
709/223
6,438,705 B1 * 8/2002 Chao .................... G06F 11/1425
709/226
(Continued)

OTHER PUBLICATIONS

Usgaonkar, et al., U.S. Appl. No. 14/101,016, titled *Systems and Methods for High Availability in Multi-Node Storage Networks*, filed Dec. 9, 2013 (36 pages).

*Primary Examiner* — Brian J Gillis
*Assistant Examiner* — Boris Grijalva Lobos
(74) *Attorney, Agent, or Firm* — LeClairRyan, a Professional Corporation

(57) ABSTRACT

A distributed control protocol dynamically establishes high availability (HA) partner relationships for nodes in a cluster. A HA partner relationship may be established by copying (mirroring) information maintained in a non-volatile random access memory (NVRAM) of a node over a HA interconnect to the NVRAM of a partner node in the cluster. The distributed control protocol leverages a Cluster Liveliness and Availability Manager (CLAM) utility of a storage operating system executing on the nodes to rebalance NVRAM mirroring and alter HA partner relationships of the nodes in the cluster. The CLAM utility is configured to maintain various cluster related issues, such as CLAM quorum events, addition or subtraction of a node in the cluster and other changes in configuration of the cluster. Notably, the CLAM utility is an event based manager that implements the control protocol to keep the nodes informed of any cluster changes through event generation and propagation.

18 Claims, 8 Drawing Sheets

(58) Field of Classification Search
CPC ............... H04L 41/085; H04L 41/0866; H04L 41/0876–41/0886; H04L 43/00; H04L 43/08–43/0811; H04L 49/00–49/10; H04L 49/102; H04L 49/45; G06F 11/00; G06F 11/006; G06F 11/008; G06F 11/30–11/3006; G06F 15/00; G06F 15/16–15/161; G06F 15/17; G06F 15/173; G06F 3/00; G06F 3/06–3/0607; G06F 3/0614; G06F 3/0617; G06F 3/0619; G06F 3/0628–3/0635; G06F 3/0653; G06F 3/0671; G06F 3/0683; G06F 3/0688; G06F 3/0689

See application file for complete search history.

(56) References Cited

U.S. PATENT DOCUMENTS

| | | | | |
|---|---|---|---|---|
| 6,618,805 B1* | 9/2003 | Kampe | ............... | G06F 11/1433 713/1 |
| 7,020,695 B1* | 3/2006 | Kundu | ............... | H04L 67/1097 709/223 |
| 7,024,483 B2* | 4/2006 | Dinker | ............... | H04L 41/12 709/204 |
| 7,035,858 B2* | 4/2006 | Dinker | ............... | G06F 17/30575 |
| 7,203,796 B1 | 4/2007 | Muppalaneni et al. | | |
| 7,272,635 B1* | 9/2007 | Longtin | ............... | H04L 41/0663 370/222 |
| 7,457,236 B2* | 11/2008 | Cheng | ............... | H04L 43/0817 370/220 |
| 7,478,263 B1* | 1/2009 | Kownacki | ............... | G06F 11/2028 714/10 |
| 7,523,110 B2* | 4/2009 | Holenstein | ............... | G06F 17/30578 707/623 |
| 7,613,947 B1* | 11/2009 | Coatney | ............... | G06F 11/0727 714/6.1 |
| 7,702,741 B2* | 4/2010 | Yuan | ............... | G06F 17/30575 709/208 |
| 7,730,153 B1 | 6/2010 | Gole et al. | | |
| 7,899,785 B2* | 3/2011 | Yuan | ............... | G06F 17/30575 707/616 |
| 7,958,304 B1* | 6/2011 | Goel | ............... | G06F 11/1096 711/114 |
| 8,145,838 B1* | 3/2012 | Miller | ............... | G06F 11/2023 711/114 |
| 8,230,086 B2* | 7/2012 | Miller | ............... | G06F 9/5061 709/201 |
| 8,380,668 B2* | 2/2013 | Bk | ............... | G06F 11/2089 707/626 |
| 8,601,101 B1* | 12/2013 | Singh | ............... | H04L 69/40 370/254 |
| 8,966,046 B2* | 2/2015 | Preden | ............... | H04W 52/0216 370/254 |
| 9,112,887 B2* | 8/2015 | Bandyopadhyay | . | H04L 67/1097 |
| 2002/0042693 A1* | 4/2002 | Kampe | ............... | H04L 12/2602 702/186 |
| 2003/0014599 A1* | 1/2003 | McBrearty | ............... | G06F 3/061 711/148 |
| 2004/0059805 A1* | 3/2004 | Dinker | ............... | G06F 11/2069 709/223 |
| 2004/0066741 A1* | 4/2004 | Dinker | ............... | H04L 41/0663 370/216 |
| 2006/0020740 A1* | 1/2006 | Bartley | ............... | G06F 11/2007 711/100 |
| 2008/0259797 A1* | 10/2008 | Gruper | ............... | H04L 45/00 370/235 |
| 2009/0094252 A1* | 4/2009 | Wong | ............... | H04L 67/06 |
| 2010/0188972 A1* | 7/2010 | Knapp | ............... | H04L 12/43 370/226 |
| 2013/0198309 A1* | 8/2013 | Muller | ............... | G06F 9/526 709/210 |
| 2014/0258771 A1* | 9/2014 | Xie | ............... | G06F 11/2005 714/4.11 |
| 2015/0161016 A1* | 6/2015 | Bulkowski | ............... | G06F 17/30584 714/4.2 |

* cited by examiner

700

| | NODE | MIRROR PARTNER | HA PARTNER |
|---|---|---|---|
| 710a | NODE 1 | NODE 2 | NODE 3 |
| 710b | NODE 2 | NODE 3 | NODE 1 |
| 710c | NODE 3 | NODE 1 | NODE 2 |

DISTRIBUTED CONTROL PROTOCOL FOR HIGH AVAILABILITY IN MULTI-NODE STORAGE CLUSTER

RELATED APPLICATION

The present application claims priority to commonly owned Indian Patent Application Serial No. 404/DEL/2014, entitled Distributed Control Protocol for High Availability in Multi-Node Storage Cluster, by Deepti Banka et al., filed on Feb. 13, 2014, the contents of which are hereby incorporated by reference.

BACKGROUND

Technical Field

The present disclosure relates to storage systems and, more specifically, to high availability of data in a cluster of storage systems.

Background Information

A storage system typically includes one or more storage devices, such as disks, into which information (i.e. data) may be entered, and from which data may be obtained, as desired. The storage system (i.e., node) may logically organize the data stored on the devices as storage containers, such as files, logical units (luns), and/or aggregates having one or more volumes that hold files and/or luns. To improve the availability of the data contained in the storage containers, a plurality of nodes may be coupled together as a cluster with the property that when one node fails another node may service data access requests directed to the failed node's containers.

In such a cluster, two nodes may be interconnected as a high availability (HA) pair configured to operate as "shared nothing" until one of the nodes fails. That is, each node may service the data access requests directed to its storage containers and only services data access requests directed to the storage containers of another node (i.e., the partner node) after a failure of that node, which triggers a takeover sequence on the surviving node (i.e., the local node). Data availability is typically guaranteed by mirroring user (e.g., client) operations logged and serviced at the local node to the HA partner node. Such mirroring typically occurs over a high speed connection between non-volatile random access memory (NVRAM) hardware on both nodes. However, the HA pair configuration is typically determined at a pre-setup phase between the nodes and, once setup, the HA pair configuration typically may not be changed. Furthermore, after a failure of the local node, the HA partner node becomes a single point of failure (SPOF) for data availability until the failed node becomes operational because of an inability to redirect mirroring, even though there may be other available nodes in the cluster.

A possible solution to reduce dependency on the SPOF is to physically relocate some of the data to another node in a different HA pair of the cluster. Yet, this solution may be infeasible since the size of the storage containers may be too large. Moreover, relocation of data is both disk and network intensive, as such an operation may involve reading (retrieving) the data from one or more disks of a source node, transferring the retrieved data over a network to a destination node and writing (storing) the transferred data to one or more disks of the destination node. Another possible solution may use an aggregate relocation (ARL) approach that transfers an entire aggregate to the different HA pair. While this approach does not involve physical movement of the data, it is unfriendly from the point of storage management, since it requires intervention by a user to identify the aggregate. Furthermore, only the relocated aggregate may have HA support, which implicitly renders ARL non-practical.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIG. 7 illustrates contents of a neighborhood HA configuration table; and

DESCRIPTION OF ILLUSTRATIVE EMBODIMENTS

Figure 1:
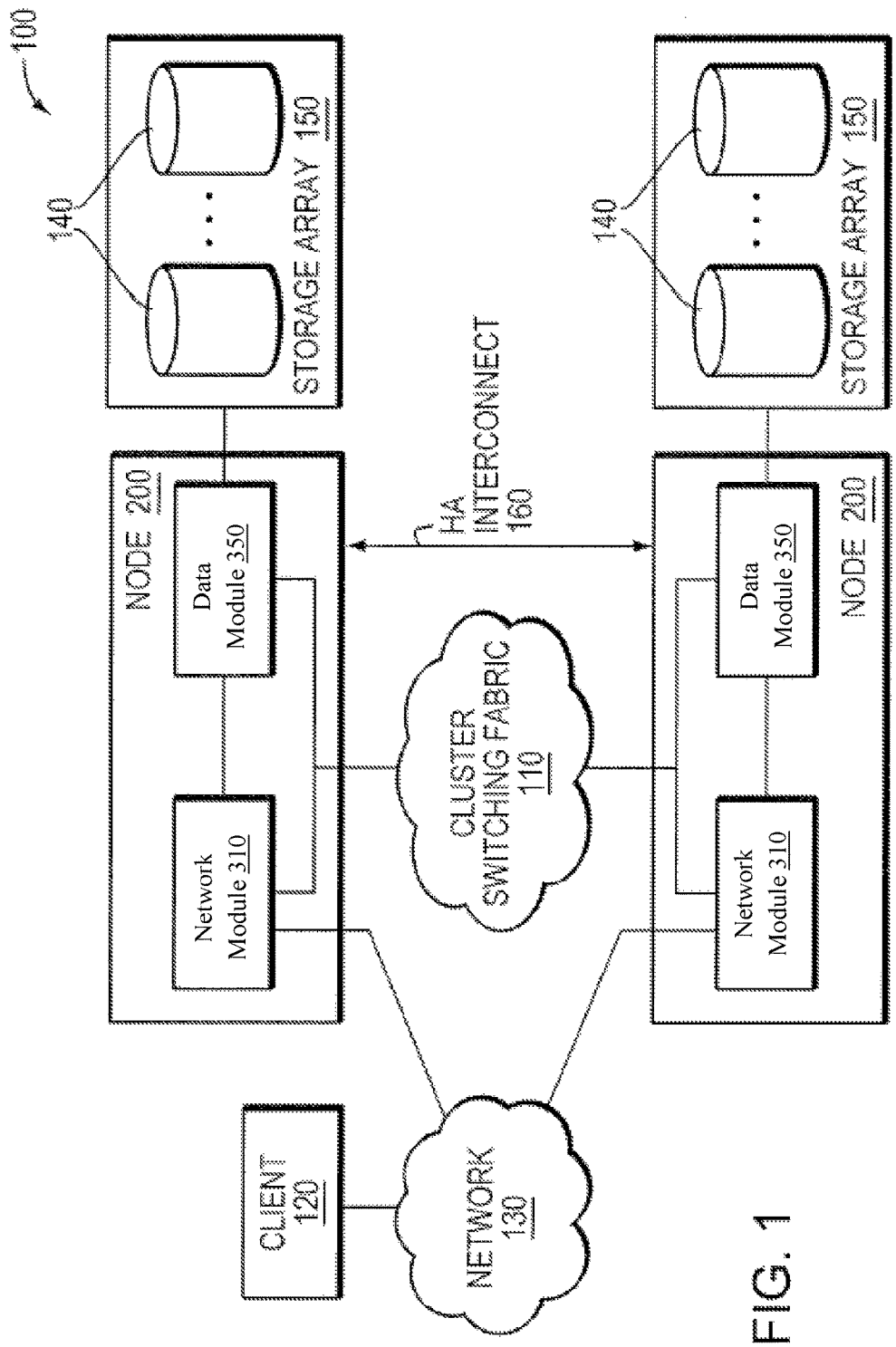
FIG. 1 is a block diagram of a plurality of nodes interconnected as a cluster.

The embodiments described herein provide a distributed control protocol configured to dynamically establish high availability (HA) partner relationships for nodes in a cluster. In an embodiment, a HA partner relationship may be established by copying (mirroring) information maintained in a non-volatile random access memory (NVRAM) of a node over a HA interconnect to the NVRAM of a partner node in the cluster. The information illustratively relates to status of hardware and software associated with the node, as well as status of operations logged and serviced by the node. The distributed control protocol leverages a Cluster Liveliness and Availability Manager (CLAM) utility of a storage operating system executing on the nodes to rebalance the NVRAM mirroring and alter the HA partner relationships of the nodes in the cluster. To that end, the CLAM utility is configured to maintain various cluster related issues, such as CLAM quorum events, addition or subtraction of a node in the cluster and other changes in configuration of the cluster. Notably, the CLAM utility is an event based manager that implements the distributed control protocol (hereinafter the "CLAM protocol") to keep all of the nodes informed of any cluster changes through event generation and propagation.

In an embodiment, an event of the CLAM protocol is generated by the CLAM utility in response to a change in any parameters of a node or any modification in an eligibility criterion of a node for the CLAM quorum. For example, an addition (joining) of a third node to an existing two-node cluster may result in a change in the eligibility criterion of the nodes participating in the quorum. Accordingly, the joining of the third node to the cluster may satisfy a requirement of the CLAM protocol and constitute the event (i.e., a quorum change event) that triggers commencement of the protocol. Illustratively, the CLAM utility of a CLAM master node may generate and propagate (i.e., broadcast) the event as a quorum change message of the CLAM protocol to the nodes of the cluster to initiate joining of the third node to the cluster.

In response to receiving the quorum change message, the CLAM utility of each node of the cluster may generate and broadcast a quorum change message that includes information, e.g., parameters, about the node. As a result, each node may receive the parameters about each other node in the cluster. The CLAM master node of the existing cluster may then use the parameters contained in the messages to implement a daisy-chain processing technique to rebalance the NVRAM mirroring and alter the HA partner relationships among the three nodes of the newly-formed cluster. Implementation of daisy-chain processing thus reconfigures the existing cluster (e.g., to a new 3-node cluster) and CLAM quorum by determining new mirror partners and/or HA partners for the nodes of the new cluster.

Advantageously, the CLAM protocol dynamically establishes HA relationships for nodes in the cluster in a light-weight and highly scalable manner. That is, the light-weight protocol consumes negligible memory and processor resources, while utilizing a substantially equivalent amount of network resources as used in conventional two-node clusters. In addition, the protocol is completely automated (i.e., executes without any user intervention) and can seamlessly scale for any number of nodes in the cluster. The CLAM protocol also executes completely from memory (in-core) and, thus, provides fast and efficient reconfiguration of the cluster by modifying the HA partner and mirror relationship for at most two nodes of the cluster without forcing node reboot. Being light-weight and completely driven from in-core, the protocol operates in a substantially short time and with substantially low latency, thereby obviating additional overhead to a boot sequence and initialization (set-up) of HA of a node.

Multi-Node Storage Cluster

FIG. 1 is a block diagram of a plurality of nodes 200 interconnected as a cluster 100 and configured to provide storage service relating to the organization of information on storage devices. The nodes 200 may be interconnected by a cluster switching fabric 110 which, in an embodiment, may be a Gigabit Ethernet switch. The nodes 200 may also be coupled by a high availability (HA) interconnect 160 to provide a HA partner arrangement that facilitates high data availability in the cluster, as described further herein. Each node 200 may include functional components that cooperate to provide a distributed storage architecture of the cluster 100. To that end, each node 200 is generally organized as a network element (network module 310) and a disk element (data module 350). The network module 310 illustratively includes functionality that enables the node 200 to connect to one or more clients 120 over a computer network 130, while each data module 350 includes functionality that enables the node to connect to one or more storage devices 140, such as disks, of a storage array 150 to thereby render the storage service in accordance with the distributed storage architecture.

It should be noted that while there is shown an equal number of network modules and data modules in the illustrative cluster 100, there may be differing numbers of network modules and/or data modules in accordance with various embodiments described herein. For example, there may be a plurality of network modules and/or data modules interconnected in a cluster configuration 100 that does not reflect a one-to-one correspondence between the network modules and data modules. As such, the description of a node 200 as including one network module and one data module should be taken as illustrative only. In addition, there may be two or more nodes 200 coupled together by the HA interconnect 160 to provide the HA partner arrangement, as described further herein.

In an embodiment, each client 120 may be a general-purpose computer configured to interact with the node 200 in accordance with a client/server model of information delivery. That is, the client may request the services of the node, and the node may return the results of the services requested by the client, by exchanging packets over the network 130. The client may issue packets including file-based access protocols, such as the Common Internet File System (CIFS) protocol or Network File System (NFS) protocol, over the Transmission Control Protocol/Internet Protocol (TCP/IP) when accessing information in the form of storage containers, such as files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of storage containers, such as blocks or logical units (luns).

Figure 2:
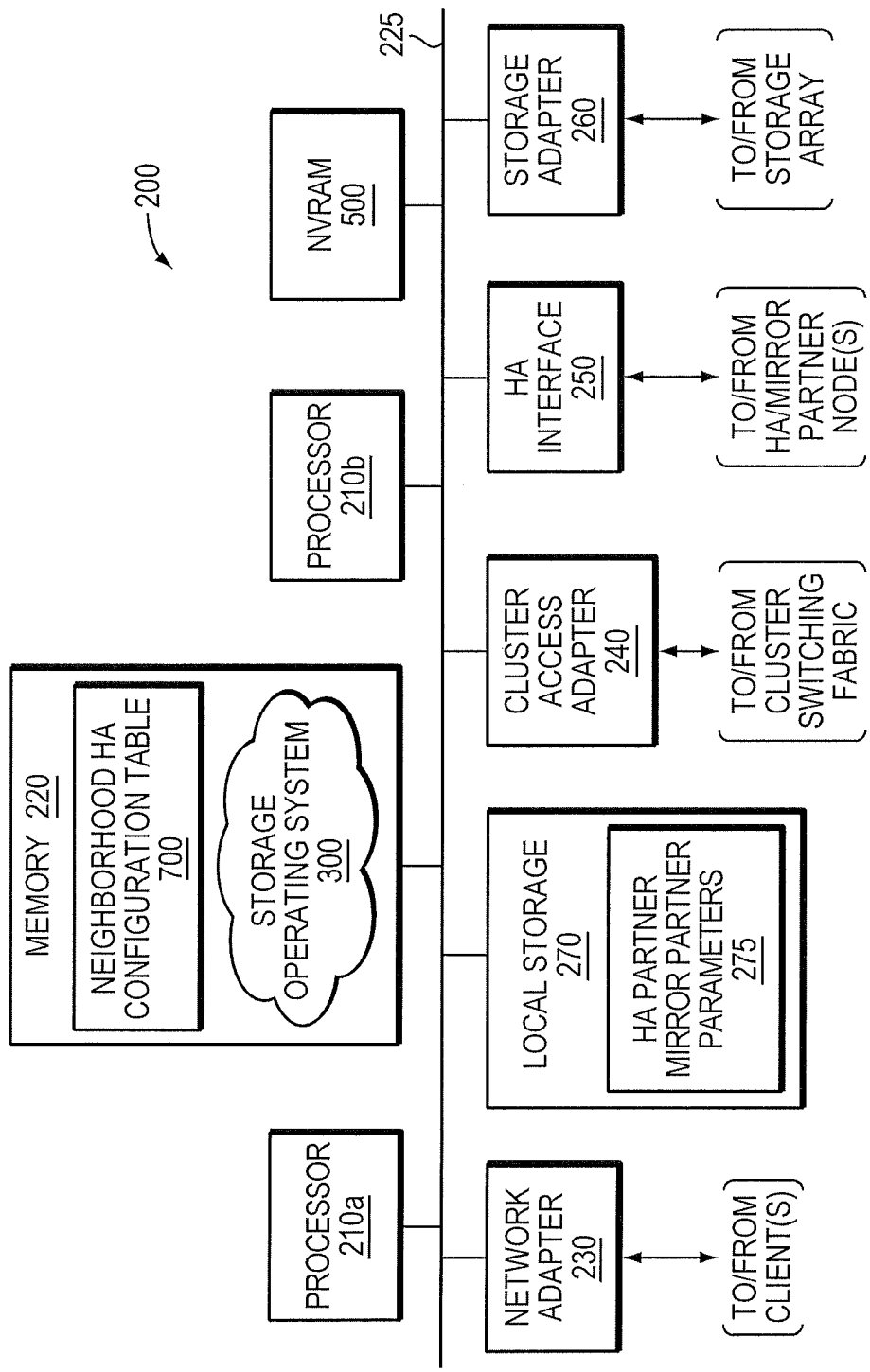
FIG. 2 is a block diagram of a node.

FIG. 2 is a block diagram of a node 200 that is illustratively embodied as a storage system having a plurality of processors 210a,b, a memory 220, a network adapter 230, a cluster access adapter 240, a HA interface 250, a storage adapter 260, local storage 270 and a non-volatile random access memory (NVRAM) 500 interconnected by a system interconnect 225, such as bus. In an embodiment, the local storage 270 may include one or more storage devices, such as solid state drives illustratively embodied as flash storage devices, utilized by the node to persistently store configuration information (e.g., HA partner and mirror partner parameters 275 described further herein) provided by one or more processes that execute as user or kernel mode processes on the node. The cluster access adapter 240 may include one or more ports adapted to couple the node 200 to other nodes of the cluster 100 via the cluster switching fabric 110. Illustratively, Ethernet may be used as the clustering protocol and interconnect media, although it will be apparent to those skilled in the art that other types of protocols and interconnects may be utilized within the cluster architecture described herein. In alternate embodiments where the network modules and data modules are implemented on separate storage systems or computers, the cluster access adapter 240 may be utilized by the network and/or data module for communicating with other network and/or data modules in the cluster 100.

Each node 200 may be embodied as a dual processor storage system executing a storage operating system 300 that illustratively implements a high-level module, such as a file system, to logically organize the information as a hierarchical structure of named storage containers, such as directories, files and/or aggregates having one or more volumes that hold files and/or luns. However, it will be apparent to those of ordinary skill in the art that the node 200 may alternatively embody a single or more than two processor system. Illustratively, one processor 210a executes the functions of the network module 310 on the node, while the other processor 210b executes the functions of the data module 350.

The memory 220 may include memory locations that are addressable by the processors and adapters for storing software programs and/or processes and data structures associated with the embodiments described herein. The processor and adapters may, in turn, include processing elements and/or logic circuitry configured to execute the software programs/processes and manipulate the data structures, such as neighborhood HA configuration table 700. In addition, the processing elements of the adapters may be configured to offload some or all of the packet processing and storage access operations, respectively, from processors 210 to thereby increase the performance of the storage service provided by the node. The storage operating system 300, portions of which are typically resident in memory and executed by the processing elements, functionally organizes the node 200 by, inter alia, invoking operations in support of the storage service implemented by the node.

It will be apparent to those skilled in the art that other processing and memory means, including various computer readable media, may be used for storing and executing program instructions pertaining to the embodiments herein. It is also expressly contemplated that the various processes, software layers, architectures and procedures described herein can be implemented in hardware, firmware, software or a combination thereof. Moreover, it is expressly contemplated that the various software programs, processes and layers described herein may be embodied as modules configured to operate in accordance with the disclosure, e.g., according to the functionality of a similar program, process or layer.

The network adapter 230 may include one or more ports adapted to couple the node 200 to the client(s) 120 over computer network 130, which may include one or more point-to-point links, wide area networks, virtual private networks implemented over a public network (Internet) or a shared local area network. The network adapter 230 may thus include the mechanical, electrical and signaling circuitry needed to connect the node to the network which, illustratively, may embody an Ethernet network or a Fibre Channel (FC) network. In an embodiment, the network adapter 230 may include a conventional network interface controller (NIC) or, alternatively, a TCP/IP offload engine (TOE) and/or an iSCSI target host bus adapter (HBA), each of which may provide a level of acceleration for use with the iSCSI protocol. In alternate embodiments, there may be a plurality of network adapters, each of which may accept iSCSI connections.

The storage adapter 260 illustratively cooperates with the storage operating system 300 executing on the node 200 to access information requested by the client. The information may be stored on any type of attached array of writable storage device media such as video tape, optical, DVD, magnetic tape, bubble memory, electronic random access memory, micro-electro mechanical and any other similar media adapted to store information, including data and parity information. However, the information is illustratively stored on the disks 140 of array 150. The storage adapter may include one or more ports having input/output (I/O) interface circuitry that couples to the disks over an I/O interconnect arrangement, such as a conventional serial attached SCSI (SAS) or FC link topology.

Storage of information on each array 150 is illustratively implemented as one or more storage "volumes" that include a collection of physical storage disks 140 cooperating to define an overall logical arrangement of volume block number space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the embodiments herein.

The NVRAM 500 may include a back-up battery or other built-in last-state retention capability (e.g., non-volatile semiconductor memory such as storage class memory) that is capable of maintaining information in light of a failure to the node and cluster environment. The HA interface 250 may include port circuitry adapted to couple the node 200 to one or more partner nodes of the cluster 100 via the HA interconnect 160. The HA interconnect is illustratively a high-speed connection between the nodes that may be used to mirror information stored in the NVRAM among the partner nodes to facilitate high data availability in the cluster. The HA interconnect 160 may embody various types of high-speed connections and protocols, such as Infiniband; however, in an embodiment, the interconnect is illustratively implemented as a switched network, such as Ethernet.

Storage Operating System

To facilitate access to the disks 140, the storage operating system 300 illustratively implements a write-anywhere file system that cooperates with one or more virtualization modules to "virtualize" the storage space provided by disks 140. The file system logically organizes the information as a hierarchical structure of named storage containers, such as directories and files, on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of storage containers, such as blocks, on the disks that are exported as named luns. In an embodiment, the storage operating system is preferably the NetApp® Data ONTAP™ operating system available from NetApp Inc., Sunnyvale, Calif. that implements a Write Anywhere File Layout (WAFL®) file system. However, it is expressly contemplated that any appropriate storage operating system may be enhanced for use in accordance with the embodiments described herein.

Figure 3:
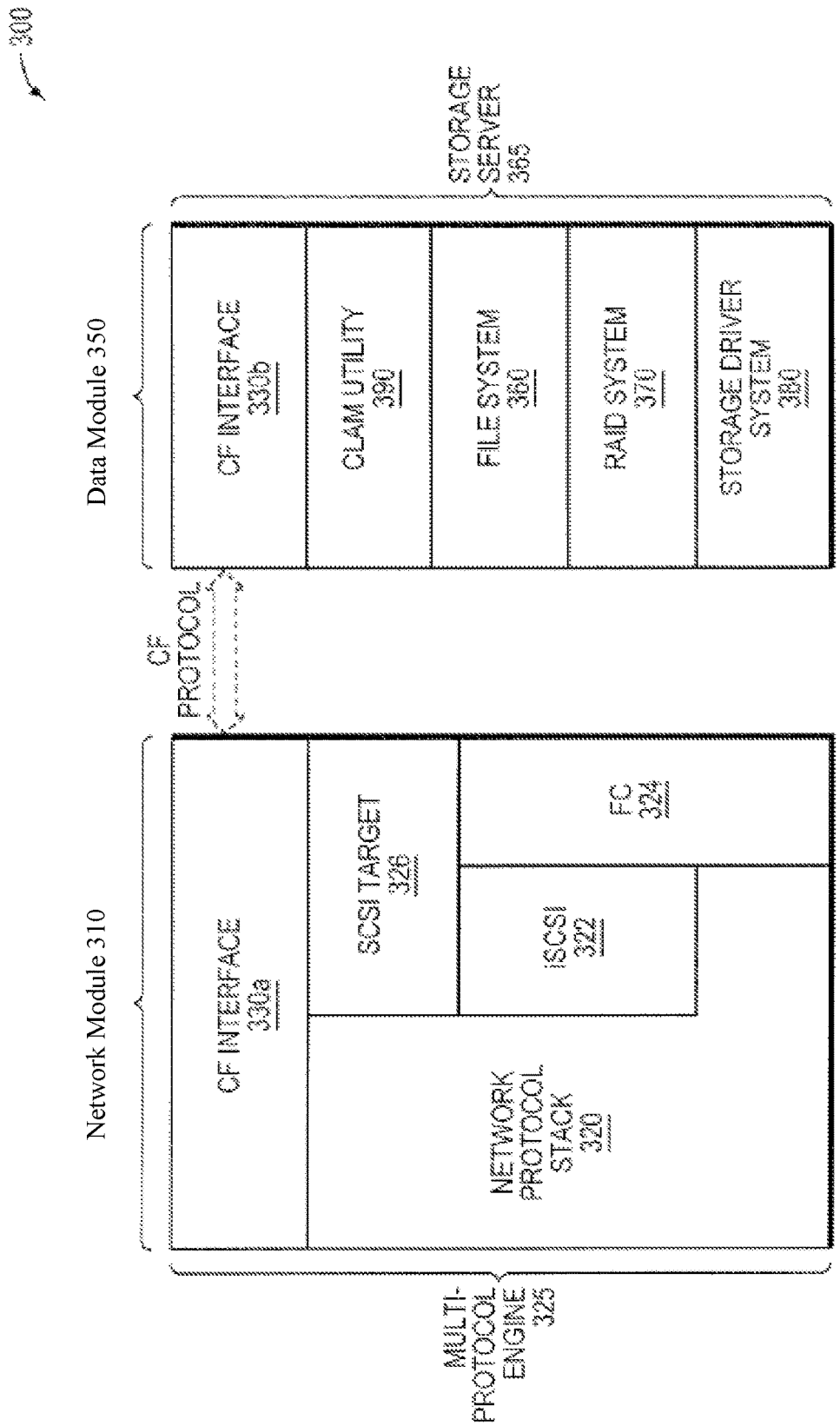
FIG. 3 is a block diagram of a storage operating system.

FIG. 3 is a block diagram of the storage operating system 300 that may be advantageously used with the embodiments described herein. In an embodiment, the storage operating system includes a series of software layers organized to form a multi-protocol engine 325 that provides data paths for clients to access information stored on the node using file and block access protocols. The multi-protocol engine 325 may be embodied as a network protocol stack 320 that includes a media access layer of network drivers (e.g., gigabit Ethernet drivers) configured to interface to network protocol layers, such as an IP layer and its supporting transport mechanisms, a TCP layer and a User Datagram Protocol (UDP) layer. The network protocol stack 320 may also include a file system protocol layer configured to provide multi-protocol file access and, to that end, includes support for the Direct Access File System (DAFS) protocol, the NFS protocol, the CIFS protocol and the Hypertext Transfer Protocol (HTTP) protocol. A VI layer may implement a VI architecture to provide direct access transport (DAT) capabilities, such as RDMA, as required by the DAFS protocol.

In an embodiment, the multi-protocol engine 325 also includes an iSCSI driver layer 322 configured to provide block protocol access over the TCP/IP network protocol layers, and a FC driver layer 324 configured to receive and transmit block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 300 includes a series of software layers organized to form a storage server 365 that provides, inter alia, data paths for accessing information stored on the disks 140 of the node 200. To that end, the storage server 365 includes a file system 360, a RAID system module 370 and a storage driver system 380. The RAID system 370 manages the storage and retrieval of information to and from the volumes/disks in accordance with I/O operations, while the storage driver system 380 implements a storage (disk) access protocol such as, e.g., the SCSI protocol. Illustratively, the file system 360 implements a virtualization system of the storage operating system 300 through the interaction with one or more virtualization modules embodied as, e.g., a virtual disk (vdisk) module (not shown) and a SCSI target module 326. The vdisk module enables access by administrative interfaces in response to a user (system administrator) issuing commands to the node 200. The SCSI target module 326 is generally disposed between the iSCSI and FC drivers 322, 324 and the file system 360 to provide a translation layer of the virtualization system between a logical unit space and a file system space, where logical units are represented as named storage containers within the file system space.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

The storage operating system 300 also includes a Cluster Liveliness and Availability Manager (CLAM), which is a cluster-wide utility configured to provide reliable communication between all of the nodes in the cluster 100. Illustratively, the CLAM utility 390 is implemented as a kernel process within a cluster transaction manager of the storage operating system 300 that enables the nodes of the cluster to participate in consistent transactions using voting algorithms. The CLAM utility 390 is configured to determine, on a periodic basis, the current live members of the cluster from the perspective of their abilities to participate in such transactions. In an embodiment, the CLAM utility 390 maintains various cluster related issues, such as CLAM quorum events, addition or subtraction of a node in the cluster and other changes in configuration of the cluster 100. Notably, the CLAM utility 390 is an event based manager that implements a CLAM protocol to keep all of the nodes 200 informed of any cluster changes through event generation and propagation.

As used herein, the term "storage operating system" generally refers to the computer-executable code operable on a computer to perform a storage function that manages data access and may, in the case of a node 200, implement data access semantics of a general-purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the embodiments described herein may apply to any type of special-purpose (e.g., file server, filer or storage serving appliance) or general-purpose computer, including a standalone computer or portion thereof, embodied as or including a storage system. Moreover, the described embodiments can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the embodiments herein may be utilized with any suitable file system, including a write in place file system.

In an embodiment, the storage server 365 is embodied as data module 350 of the storage operating system 300 to service one or more storage containers of array 150. In addition, the multi-protocol engine 325 is embodied as network module 310 to (i) perform protocol termination with respect to a client issuing incoming data access request packets over the network 130, as well as (ii) redirect those data access requests to any storage server 365 of the cluster 100. Moreover, the network module 310 and data module 350 cooperate to provide a highly-scalable, distributed storage architecture of the cluster 100. To that end, each module includes a cluster fabric (CF) interface module 330a,b adapted to implement intra-cluster communication among the modules, including data-module-to-data-module communication.

The protocol layers, e.g., the NFS/CIFS layers and the iSCSI/FC layers in conjunction with the SCSI target layer, of the network module 310 function as protocol servers that translate file-based and block-based data access requests from clients. As part of the processing of these requests, the network module may request data services from the data module 350. This may be achieved via operating system primitive operations (commands) that are embedded within CF messages by the CF interface module 330 for transmission to the nodes of the cluster 100. In an embodiment, the CF interface modules 330 cooperate to provide a single file system image across all data modules 350 in the cluster 100. A data access request received by an network module is processed by that network module. As part of the processing, the network module may send requests to one or more data modules.

In an embodiment, the network module 310 and data module 350 may be implemented as separately-scheduled processes of storage operating system 300; however, in an alternate embodiment, the modules may be implemented as pieces of code within a single operating system process. Communication between an network module and data module is thus illustratively effected through the use of message passing between the modules although, in the case of remote communication between an network module and data module of different nodes, such message passing occurs over the cluster switching fabric 110. A known message-passing mechanism provided by the storage operating system to transfer information between modules (processes) is an Inter Process Communication (IPC) mechanism. The protocol used with the IPC mechanism is illustratively a generic file and/or block-based "agnostic" CF protocol that includes a collection of methods/functions constituting a CF application programming interface (API).

In an embodiment, the CF interface modules 330 may implement the CF protocol for communicating operating system commands among the nodes (modules) of cluster 100. Communication may illustratively be effected by the data module exposing the CF API to which an network module (or another data module) issues calls. To that end, the CF interface module 340 may be organized as a CF encoder and CF decoder. The CF encoder, e.g., CF interface 330a on network module 310, may encapsulate a CF message as (i) a local procedure call (LPC) when communicating an operating system command to a data module 350 residing on the same node 200 or (ii) a remote procedure call (RPC) when communicating the command to a data module residing on a remote node of the cluster 100. In either case, the CF decoder, e.g., CF interface 330b on data module 350, may de-encapsulate the CF message and process the command.

Figure 4:
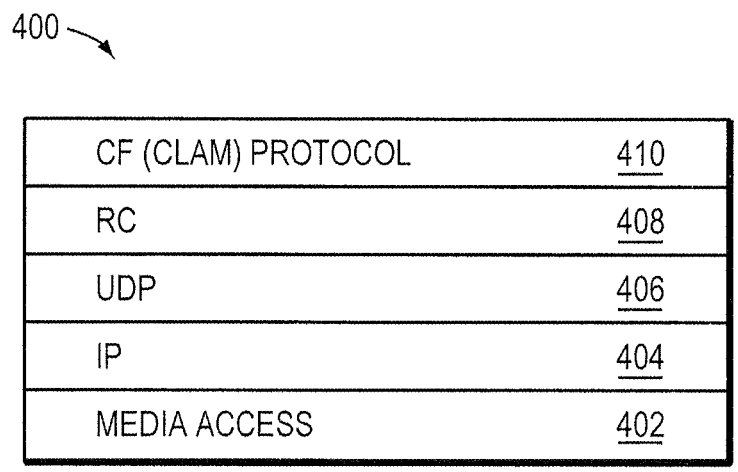
FIG. 4 is a block diagram of a format of a cluster fabric message.

FIG. 4 is a block diagram illustrating the format of a CF message 400 in accordance with one or more embodiments described herein. The CF message 400 is illustratively used for RPC communication over the cluster switching fabric 110 between remote modules and/or nodes of the cluster 100; however, it should be understood that the term "CF message" may be used generally to refer to LPC and RPC communication between modules of the cluster. In an embodiment, the CF message 400 may include a media access layer 402, an IP layer 404, a UDP layer 406, a reliable connection (RC) layer 408 and a CF protocol layer 410. Illustratively, the CF protocol is datagram based and, as such, involves transmission of "envelopes" or messages in a reliable manner from a source node (module) to a destination node (module). The RC layer 408 implements a reliable transport protocol that is adapted to process such messages in accordance with a connectionless protocol, such as UDP 406. As noted, the CF protocol is an agnostic protocol configured to transfer information (such as commands) among the nodes (modules) of the cluster 100; the CF protocol layer 410 is that portion of message 400 that carries the commands. An example of such an agnostic protocol is the CLAM protocol configured to leverage the CLAM utility 390, as described further herein.

High Data Availability

In an embodiment, two or more nodes 200 of the cluster may be configured to provide takeover (TO) protection to each other in the event of a failure to one or more of the nodes. To implement a TO sequence in the event of such a failure, the nodes 200 may communicate among themselves across one or more communication links, such as the cluster switching fabric 110, to establish a HA partner arrangement. Each node 200 may maintain information relating to status of hardware and software associated with the node, as well as status of storage requests (operations) logged and serviced by the node. The information is illustratively maintained in the NVRAM 500 of the node (i.e., the local node) and, to guarantee high data availability, copied (mirrored) over the HA interconnect 160 to the NVRAM of a partner node associated with the local node in accordance with the established HA partner arrangement which, inter alia, balances the NVRAM mirroring among the nodes. An example of a high availability, multi-node storage cluster is generally described in U.S. patent application Ser. No. 14/101,016, titled Systems and Methods for High Availability in Multi-Node Storage Networks, filed Dec. 9, 2013.

Figure 5:
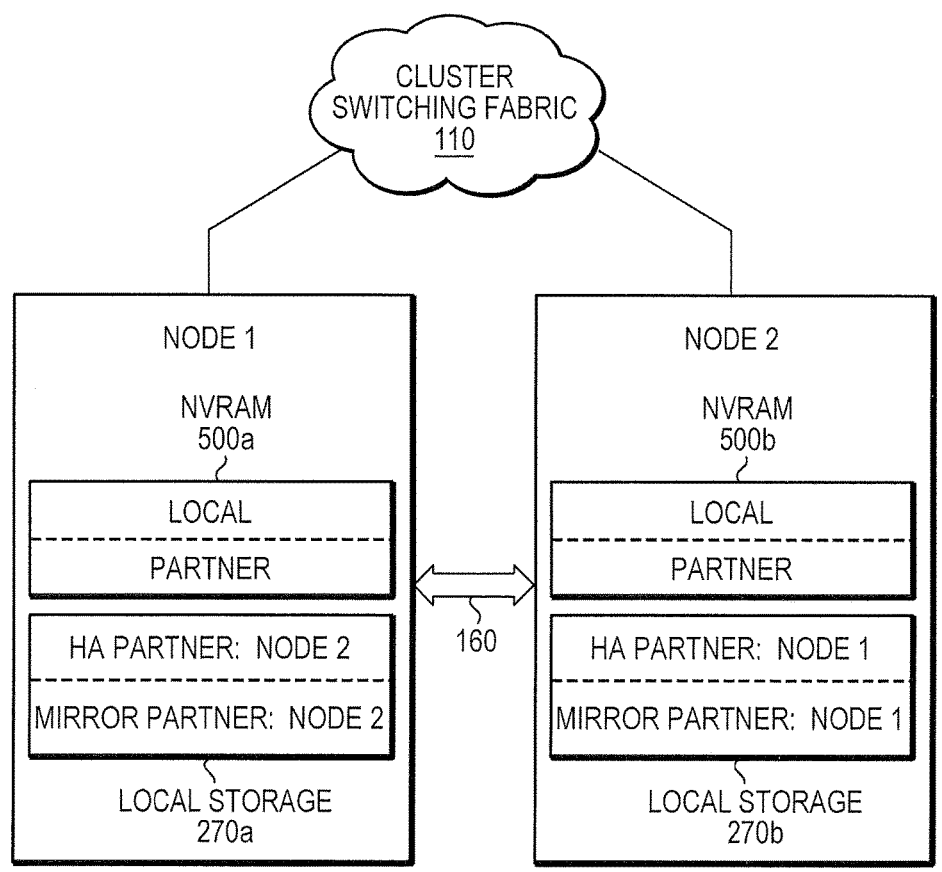
FIG. 5 illustrates an organization of non-volatile random access memory and local storage in accordance with a high availability (HA) partner arrangement in a two-node cluster.

FIG. 5 illustrates an organization of the NVRAM and the local storage in accordance with a HA partner arrangement that facilitates high data availability in a two-node cluster. The NVRAM 500a,b of each node is illustratively organized into two portions. A first portion (i.e., the "LOCAL" portion) of the NVRAM may store information about the hardware and software, including logged operations, of the local node, and a second portion (i.e., the "PARTNER" portion) of the NVRAM may store similar, mirrored information associated with its partner node that is used when the local node takes over operations in response to a failure of the partner node. In an embodiment, the local storage 270 may be embodied as a flash-based cfcard configured to store parameters 275, such as an identification (ID) of the HA partner node for the local node and an ID of the mirror partner node for the local node, as boot time variables. As used herein, the term mirror partner denotes the "node for which the local node is mirroring" and is therefore distinguished from the term HA partner, which denotes "the node hosting the NV mirror at the local node." For example in the case of the two-node cluster having the HA partner arrangement, the local storage 270a for node 1 may identify node 2 as the HA partner and node 2 as the mirror partner. Conversely, the local storage 270b for node 2 may identify node 1 as the HA partner and node 1 as the mirror partner.

Conventionally, operating system software executing on each node of the HA partner arrangement may configure the HA partner relationship statically, e.g., the HA partner node's ID may be hardwired into the NVRAM of the node. Even though the relationship is hardwired, the software may still force reboot of both nodes before enabling the HA partner arrangement between the nodes. Such static configuration has at least two disadvantages. First, the static hardwiring inherently prohibits a node's HA pairing with any other node in the cluster in the event of failure of its partner node. That is, the static hardwiring provides an inherent barrier to extending data availability beyond the partner node in the cluster. Second, the business agility of applications may be impacted when the nodes are forced to reboot. The embodiments described herein address these disadvantages.

CLAM Protocol

The embodiments described herein provide a distributed control protocol configured to dynamically establish HA partner relationships for nodes in a cluster. In an embodiment, a HA partner relationship may be established by copying (mirroring) information maintained in the NVRAM of a node over the HA interconnect to the NVRAM of a partner node in the cluster. The distributed control protocol (hereinafter the "CLAM protocol") is illustratively implemented by the CLAM utility of the storage operating system executing on the nodes to rebalance the NVRAM mirroring and alter the HA partner relationships of the nodes in the event of cluster configuration changes, such as node join and node leave (crash). Rebalancing of the NVRAM mirroring illustratively denotes distributing (e.g., in a substantially balanced or even manner) the NVRAM mirroring from a previous configuration of nodes to a new configuration of nodes. As noted, a role of the CLAM utility is to periodically detect which nodes of the cluster are alive and available to participate in transactions; in addition, the utility ensures that a transaction will only succeed if the participating nodes are live, connected members of a CLAM quorum. The CLAM utility runs continuously on all nodes of the cluster, including nodes that are currently out of the CLAM quorum, to ensure that those latter nodes may quickly rejoin the quorum once they are alive and reconnected. Illustratively, the CLAM quorum is based on a determination, by the CLAM utility, of liveness and connectivity among all of the nodes in the cluster, as defined by cluster membership of a cluster sitelist.

Figure 6:
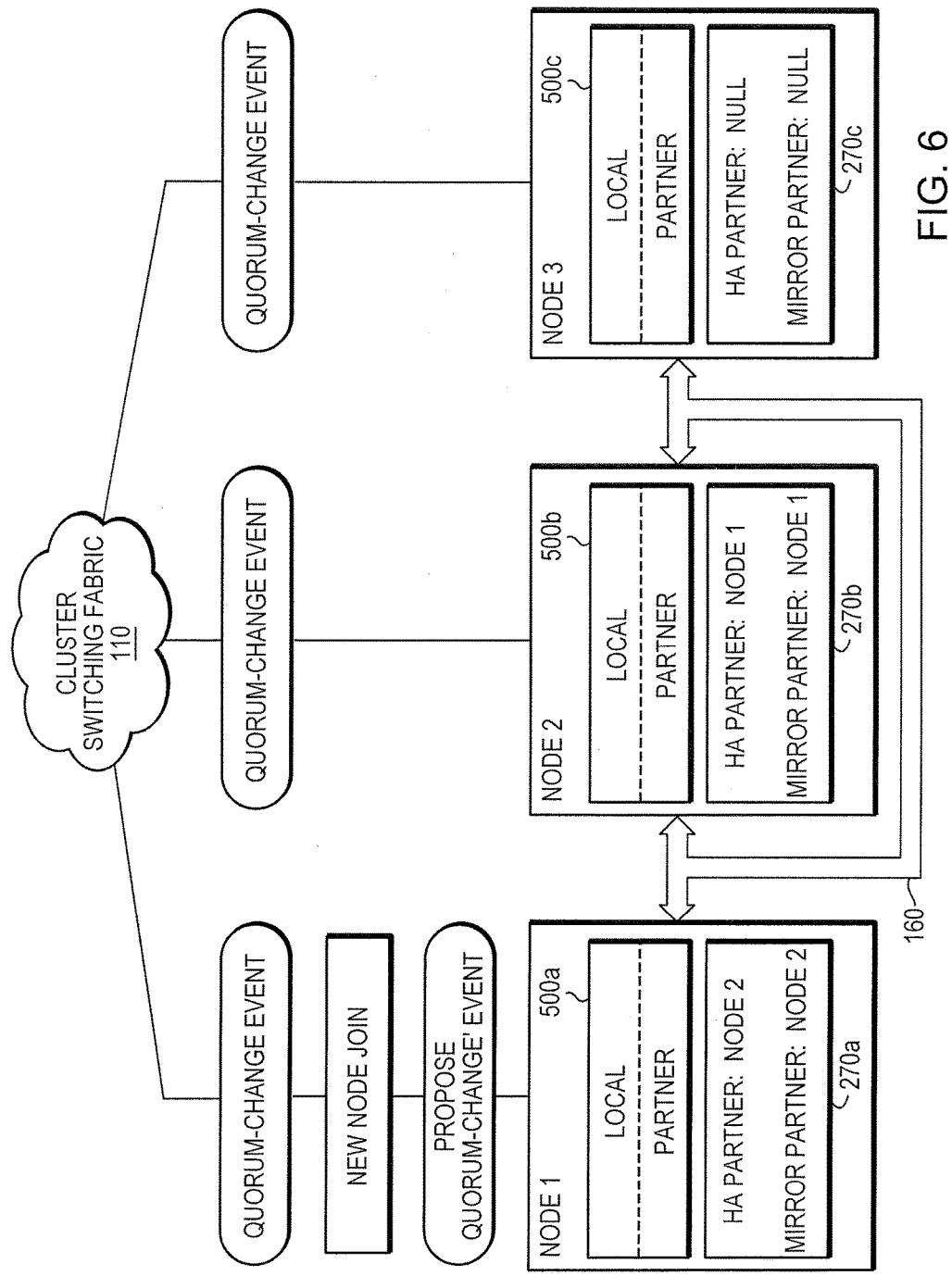
FIG. 6 illustrates joining of a third node to the two-node cluster.

In an embodiment, an event of the CLAM protocol is generated by the CLAM utility 390 in response to a change in any parameters of a node 200 or any modification (change) in an eligibility criterion of a node for the CLAM quorum. For example, an addition (joining) of a third node to an existing two-node cluster may result in a change in the eligibility criterion of the nodes participating in the quorum. Accordingly, the joining of the third node to the cluster may satisfy a requirement of the CLAM protocol and constitute the event (i.e., a quorum change event) that triggers commencement of the protocol. FIG. 6 illustrates joining of the third node to the existing two-node cluster. Illustratively, the CLAM utility of a CLAM master node may generate and propagate (e.g., broadcast) the event over the cluster switching fabric 110 as a quorum change message (QUORUM_CHANGE event) of the CLAM protocol to the nodes of the cluster to initiate joining of the third node to the cluster. The local storage 270a,b for nodes 1 and 2 illustratively identify each other as HA and mirror partners, while node 3 boots with these parameters set to NULL, e.g., in local storage 270c. This arrangement is similar to a conventional two-node HA partner arrangement where two nodes mirror to each other.

In an embodiment, the third node may request joining of the cluster by, e.g., broadcasting a request to join message over the cluster switching fabric 110. The message is received by the CLAM master node, which then generates and broadcasts the quorum change message over the cluster switching fabric 110. In response to receiving the quorum change message, each node of the cluster may generate and broadcast a quorum change message that includes information, e.g., parameters, about the node. As a result, each node may receive the parameters about each other node in the cluster. The CLAM master node (e.g., node 1) of the existing cluster then uses the parameters contained in the received messages to implement a daisy-chain processing technique to rebalance the NVRAM mirroring and alter the HA partner relationships among the three nodes of the newly-formed cluster. In an embodiment, the CLAM master node is the node that initiated formation of the existing cluster (quorum) by, e.g., generating and propagating an initial quorum change message and receiving responses from one or more other nodes that were available to join the cluster. Illustratively, the parameters contained in each quorum change message broadcasted by each node of the cluster include, inter alia, (i) an ID of the node within the cluster, (ii) an updated cluster sitelist, (iii) an ordinal number of the node within the cluster sitelist, (iv) an indication of whether the node is the CLAM master, (v) the ID of the mirror partner node of the node and (vi) the ID of the HA partner node of the node.

In an embodiment, the CLAM master node illustratively maintains a data structure, i.e., the neighborhood HA configuration table 700, containing parameters received from a previous broadcast of quorum change messages. FIG. 7 illustrates contents of the neighborhood HA configuration table 700 that may be advantageously used with the embodiments described herein. Illustratively, the configuration table 700 includes a plurality of rows (entries) 710a-c and a plurality of columns (fields) 720a-c. A first field 720a of each entry 710a-c contains the ID of a node within the cluster, whereas a second field 720b contains the ID of the mirror partner node of the node and a third field 720c contains the ID of the HA partner node of the node. It should be noted that the order of entries in the neighborhood HA configuration table 700 is illustratively based on a boot sequence of the nodes in the cluster; however, it will be understood to those skilled in the art that other table ordering arrangements may be employed within the embodiments described herein.

In an embodiment, the CLAM master node compares the contents of the neighborhood HA configuration table 700 with the parameters contained in the received quorum change messages to determine the type of event represented by the received messages. For example, the received quorum change messages may include parameters for only nodes 1 and 2 and, notably, not node 3 (NULL). Accordingly, the CLAM master node may determine that the messages represent a "new node join" event (FIG. 6) and creates a new entry (e.g., 710c) for node 3 in the neighborhood HA configuration table 700. The CLAM master node then implements the daisy-chain processing technique to rebalance the NVRAM mirroring and alter the HA partner relationships by determining new mirror partner and HA partner nodes for each node in the newly-formed cluster.

In an embodiment, rebalancing of the NVRAM mirroring illustratively occurs in a "forward" daisy-chain fashion such that, e.g., node 1 mirrors to node 2, node 2 mirrors to node 3, and node 3 mirrors to node 1. Conversely, altering of the HA partner relationships illustratively occurs in a "reverse" daisy-chain fashion such that, e.g., node 1 hosts the NV mirror for node 3, node 2 hosts the NV mirror for node 1, and node 3 hosts the NV mirror for node 2. It will be understood to those skilled in the art that other processing techniques to rebalance NVRAM mirroring and alter HA partner relationships may be employed within the embodiments described herein.

Referring again to FIG. 6, the new mirror partner node (i.e., from rebalancing of the NVRAM mirroring) and new HA partner node (i.e., from altering of the HA partner relationship) parameters for each node, as determined by the daisy-chain processing, are encapsulated in a new quorum change message (denoted "propose QUORUM_CHANGE' event") that is generated and propagated by the CLAM master node to the other nodes of the newly-formed 3-node cluster. Upon receiving the new message, each node interprets the parameters relevant to itself and, if necessary, makes changes to its mirror partner node and/or HA partner node IDs maintained in its local storage 270.

Figure 8:
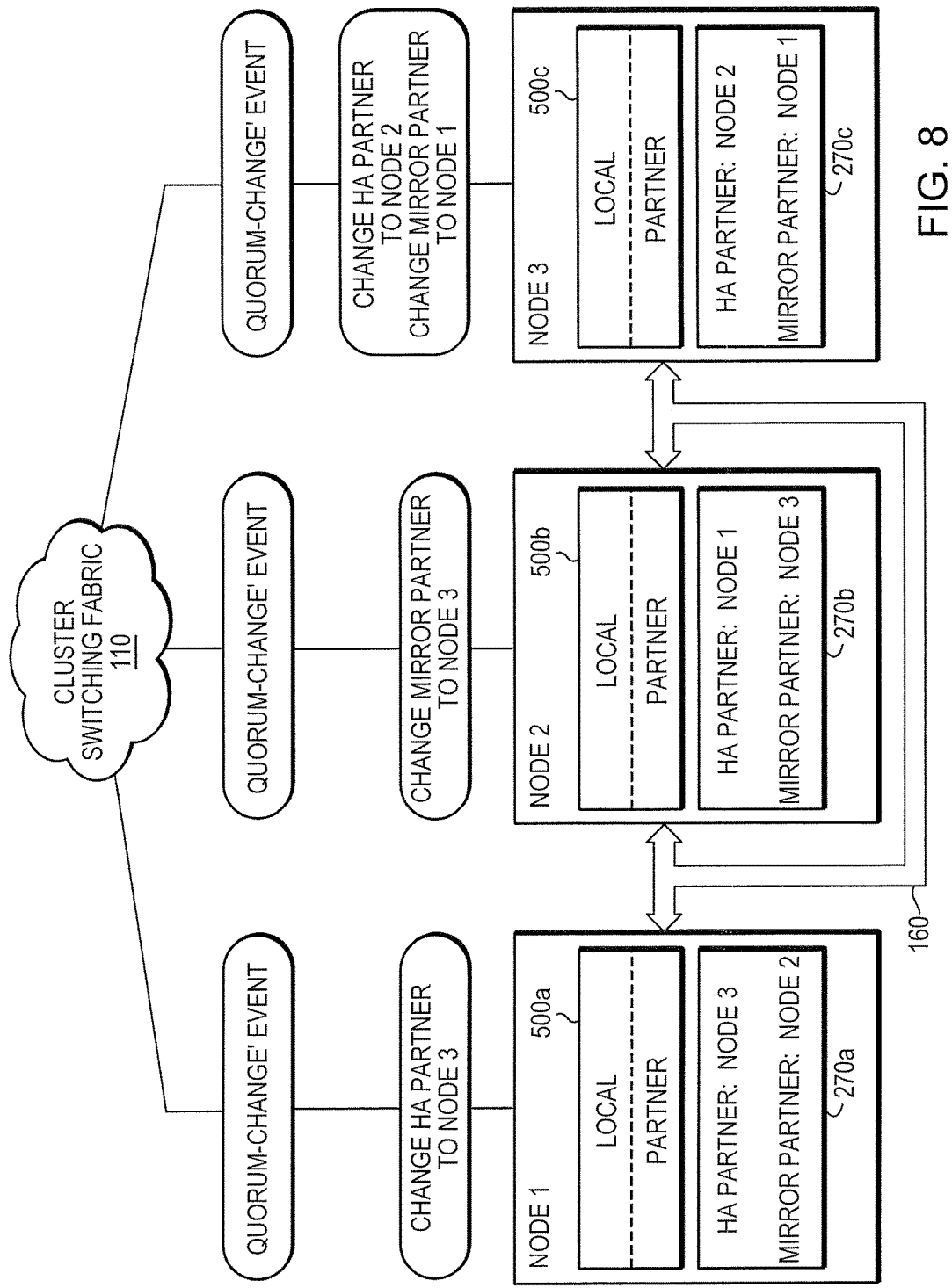
FIG. 8 illustrates changes to each node after joining of the third node to form a a-node cluster.

FIG. 8 illustrates changes to each node after joining of the third node to form the 3-node cluster. Illustratively, in the case of the 3-node cluster having the HA partner arrangement, the parameters 275 of local storage 270a for node 1 change to identify node 3 as the HA partner, while continuing to identify node 2 as the mirror partner. In addition, the parameters 275 of local storage 270b for node 2 continue to identify node 1 as the HA partner, while changing to identify node 3 as the mirror partner. Lastly, the parameters 275 of local storage 270c for node 3 change to identify node 2 as the HA partner and node 1 as the mirror partner. Implementation of daisy chain processing thus reconfigures the existing cluster (e.g., to a new 3-node cluster) and CLAM quorum by determining new mirror partners and/or HA partners for the nodes of the new cluster.

While there have been shown and described illustrative embodiments for providing a distributed control protocol configured to dynamically establish HA partner relationships for nodes in a cluster, it is to be understood that various other adaptations and modifications may be made within the spirit and scope of the embodiments herein. For example, embodiments have been shown and described herein with relation to joining of a new node to an existing cluster. However, the embodiments in their broader sense are not so limited, and may, in fact, also allow for leaving (crashing) of a node from an existing cluster. In the case of a node crash, two nodes of the existing cluster are impacted: a first node in the cluster loses its mirror partner node and a second node enters into the TO sequence. As noted, a role of the CLAM utility is to periodically detect which nodes are alive and connected to the cluster; in an embodiment, the utility 390 detects such liveness and connectivity through a message-driven mechanism wherein, if a node does not send, e.g., a liveness message within a predetermined period of time, that node is considered crashed and out of the CLAM quorum. A message of the CLAM protocol is generated by the CLAM utility of each node in response to the node crash and propagated over the cluster switching fabric 110 to the remaining "alive" nodes of the cluster. Illustratively, the message is received by the CLAM master node and interpreted to be a node crash scenario. The requisite daisy-chain processing occurs and the identities of new mirror and HA partners of the impacted nodes are encapsulated (populated) into a quorum change message that is broadcasted to the remaining nodes of the cluster. Each remaining node may then change its mirror and/or HA partner node parameters, as required.

Advantageously, the CLAM protocol dynamically establishes HA relationships for nodes in the cluster in a light-weight and highly scalable manner. That is, the light-weight protocol consumes negligible memory and processor resources, while utilizing a substantially equivalent amount of network resources as used in conventional two-node clusters. In addition, the protocol is completely automated (i.e., executes without any user intervention) and can seamlessly scale for any number of nodes in the cluster. The CLAM protocol also executes completely from memory (in-core) and, thus, provides fast and efficient reconfiguration of the cluster by modifying the HA partner and mirror relationship for at most two nodes of the cluster without forcing node reboot. For instance, in the case of a node addition, only two other nodes of the cluster are impacted: one node's mirror partner node changes and the other node's HA partner changes. In the case of the a node crash, one node is impacted by losing its mirror partner node, while the other node to which the crashed node was mirroring is also impacted. Notably, all other nodes of the cluster continue to operate without impact. Being light-weight and completely driven from in-core, the CLAM protocol operates in a substantially short time and with substantially low latency, thereby obviating additional overhead to a boot sequence and initialization (set-up) of HA of a node.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, by a first node computing device, a plurality of quorum change messages from a plurality of nodes via a cluster switching fabric, wherein the plurality of nodes comprises at least a second node of an existing cluster and a third node;
determining, by the first node computing device, when there is a quorum change event comprising a new node join event based on absence of one or more parameters from one of the quorum change messages received from the third node; and
establishing, by the first node computing device, one or more high availability (HA) partner relationships in a new cluster based on one or more other parameters from another one of the quorum change messages received from the second node in order to join the third node to the new cluster, when the determining indicates that the quorum change event comprises a new node join event.

2. The method of claim 1 further comprising mirroring, by the first node computing device, information maintained in a first non-volatile random access memory (NVRAM) to a second NVRAM of the second node to establish a HA partner relationship with balanced NVRAM mirroring, wherein the mirroring the information comprises copying the information from the first NVRAM over a HA interconnect to the second NVRAM.

3. The method of claim 1 wherein the establishing comprises establishing one of the HA partner relationships such that the second node mirrors information maintained in a second NVRAM of the second node to a third NVRAM of the third node.

4. The method of claim 1 wherein the establishing comprises establishing one of the HA partner relationships such that the third node mirrors information maintained in a third NVRAM of the third node to a second NVRAM of the second node.

5. The method of claim 1 wherein the establishing further comprises using the one or more other parameters to reconfigure the existing cluster to the new cluster.

6. The method of claim 5 wherein the using further comprises using the one or more other parameters to determine one or more new mirror partners and HA partners for the second node or the third node of the new cluster.

7. A node computing device, comprising:
one or more processors; and
a memory coupled to the one or more processors and containing machine readable medium comprising machine executable code having stored thereon instructions for dynamically establishing high availability (HA) partner relationships, the one or more processors configured to execute the machine executable code to cause the one or more processors to:

receive a plurality of quorum change messages from a plurality of nodes via a cluster switching fabric, wherein the plurality of nodes comprises at least a first node of an existing cluster and a second node;

determine when there is a quorum change event comprising a new node join event based on an absence of one or more parameters from one of the quorum change messages received from the second node; and establish one or more HA partner relationships in a new cluster based on one or more other parameters from another one of the quorum change messages received from the first node in order to join the second node to the new cluster, when the determining indicates that the quorum change event comprises a new node join event.

8. The computing device of claim 7, wherein the one or more processor are further configured to execute the machine executable code to cause the one or more processors to mirror information maintained in a first non-volatile random access memory (NVRAM) to a second NVRAM of the first node over a HA interconnect to the second NVRAM to establish a HA partner relationship with balanced NVRAM mirroring.

9. The computing device of claim 7, wherein the one or more processor are further configured to execute the machine executable code to cause the one or more processors to establish one of the HA partner relationships such that the first node mirrors information maintained in an NVRAM of the first node to another NVRAM of the second node.

10. The computing device of claim 7, wherein the one or more processor are further configured to execute the machine executable code to cause the one or more processors to establish one of the HA partner relationships such that the second node mirrors information maintained in an NVRAM of the second node to another NVRAM of the first node.

11. The computing device of claim 7, wherein the one or more processor are further configured to execute the machine executable code to cause the one or more processors to use the one or more other parameters to reconfigure the existing cluster to the new cluster.

12. The computing device of claim 11, wherein the one or more processor are further configured to execute the machine executable code to cause the one or more processors to use the one or more other parameters to determine one or more new mirror partners and HA partners for the first node or the second node of the new cluster.

13. A non-transitory machine readable medium having stored thereon instructions for dynamically establishing high availability (HA) partner relationships comprising machine executable code which when executed by at least one machine causes the machine to:

receive a plurality of quorum change messages from plurality of nodes via a cluster switching fabric, wherein the plurality of nodes comprises at least a first node of an existing cluster and a second node;

determine when there is a quorum change event comprising a new node join event based on an absence of one or more parameters from one of the quorum change messages received from the second node; and establish one or more HA partner relationships in a new cluster based on one or more other parameters from another one of the quorum change messages received from the first node in order to join the second node to the new cluster, when the determining indicates that the quorum change event comprises a new node join event.

14. The non-transitory machine readable medium of claim 13, wherein the machine executable code, which when executed by the at least one machine, further causes the machine to mirror information maintained in a first non-volatile random access memory (NVRAM) to a second NVRAM of the first node over a HA interconnect to the second NVRAM to establish a HA partner relationship with balanced NVRAM mirroring.

15. The non-transitory machine readable medium of claim 13, wherein the machine executable code, which when executed by the at least one machine, further causes the machine to establish one of the HA partner relationships such that the first node mirrors information maintained in an NVRAM of the first node to another NVRAM of the second node.

16. The non-transitory machine readable medium of claim 13, wherein the machine executable code, which when executed by the at least one machine, further causes the machine to establish one of the HA partner relationships such that the second node mirrors information maintained in an NVRAM of the second node to another NVRAM of the first node.

17. The non-transitory machine readable medium of claim 13, wherein the machine executable code, which when executed by the at least one machine, further causes the machine to use the one or more other parameters to reconfigure the existing cluster to the new cluster.

18. The non-transitory machine readable medium of claim 17, wherein the machine executable code, which when executed by the at least one machine, further causes the machine to use the one or more other parameters to determine one or more new mirror partners and HA partners for the first node or the second node of the new cluster.

* * * * *